(12) United States Patent
McAlister

(10) Patent No.: US 8,104,082 B2
(45) Date of Patent: Jan. 24, 2012

(54) VIRTUAL SECURITY INTERFACE

(75) Inventor: Donald McAlister, Apex, NC (US)

(73) Assignee: Certes Networks, Inc., Pittsburgh, PA (US)

( * ) Notice: Subject to any disclaimer, the term of this patent is extended or adjusted under 35 U.S.C. 154(b) by 938 days.

(21) Appl. No.: 11/540,496

(22) Filed: Sep. 29, 2006

(65) Prior Publication Data
US 2008/0104692 A1    May 1, 2008

(51) Int. Cl.
*H04L 29/02* (2006.01)
*G06F 9/00* (2006.01)
*G06F 15/16* (2006.01)
*G06F 17/00* (2006.01)

(52) U.S. Cl. ............... 726/15; 726/13; 726/14; 726/12; 726/3; 713/154; 713/153; 709/238; 709/239; 709/240; 709/241; 709/242; 370/351

(58) Field of Classification Search ............. None
See application file for complete search history.

(56) References Cited

U.S. PATENT DOCUMENTS

| | | | |
|---|---|---|---|
| 5,237,611 A | 8/1993 | Rasmussen et al. | |
| 5,577,209 A | 11/1996 | Boyle et al. | |
| 5,898,784 A | 4/1999 | Kirby et al. | |
| 5,940,591 A | 8/1999 | Boyle et al. | |
| 6,035,405 A | 3/2000 | Gage et al. | |
| 6,061,600 A | 5/2000 | Ying | |
| 6,173,399 B1 | 1/2001 | Gilbrech | |
| 6,275,859 B1 | 8/2001 | Wesley et al. | |
| 6,330,562 B1 | 12/2001 | Boden et al. | |
| 6,484,257 B1 | 11/2002 | Ellis | |
| 6,556,547 B1 | 4/2003 | Srikanth et al. | |
| 6,591,150 B1 | 7/2003 | Shirota | |
| 6,658,114 B1 | 12/2003 | Farn et al. | |
| 6,697,857 B1 | 2/2004 | Dixon et al. | |
| 6,711,679 B1 | 3/2004 | Guski et al. | |
| 6,823,462 B1 | 11/2004 | Cheng et al. | |
| 6,915,437 B2 | 7/2005 | Swander et al. | |
| 6,920,559 B1 | 7/2005 | Nessett et al. | |
| 6,981,139 B2 | 12/2005 | Enokida | |
| 6,986,061 B1 | 1/2006 | Kunzinger | |
| 7,043,632 B2 * | 5/2006 | Chapman et al. | ............ 713/153 |
| 7,103,784 B1 | 9/2006 | Brown et al. | |
| 7,526,658 B1 * | 4/2009 | He et al. | ............ 713/193 |

(Continued)

OTHER PUBLICATIONS

Demystifying the IPSec Puzzle, Chapter 5, "The Fourth Puzzle Piece: The Internet Key Exchange (IKE)" pp. 87-127.

(Continued)

*Primary Examiner* — Syed A. Zia
(74) *Attorney, Agent, or Firm* — Hamilton, Brook, Smith & Reynolds, P.C.

(57) ABSTRACT

In some networking situations, securing an inner packet of a tunnel packet requires an intermediary networking device knowing a destination address of the secured inner packet. Consequently, an identity of a secured network is known to others and presents a security risk. The provided technique addresses this risk by: i) establishing at a first security interface a first secured network connection between a first and second secured network, the connection established for a first packet addressed to a virtual security interface and destined for the second secured network; and ii) responding to a network condition by establishing at a second security interface at least one second secured network connection between the first and second secured network, the connection established for a second packet addressed to the virtual security interface and destined for the second secured network.

20 Claims, 11 Drawing Sheets

U.S. PATENT DOCUMENTS

| | | | |
|---|---|---|---|
| 7,606,902 B2 * | 10/2009 | Rao et al. | 709/225 |
| 7,950,052 B2 * | 5/2011 | Lie et al. | 726/12 |
| 7,978,714 B2 * | 7/2011 | Rao et al. | 370/401 |
| 8,019,868 B2 * | 9/2011 | Rao et al. | 709/225 |
| 2002/0154782 A1 | 10/2002 | Chow et al. | |
| 2002/0162026 A1 | 10/2002 | Neuman et al. | |
| 2002/0163920 A1 * | 11/2002 | Walker et al. | 370/401 |
| 2003/0009699 A1 * | 1/2003 | Gupta et al. | 713/201 |
| 2003/0014662 A1 * | 1/2003 | Gupta et al. | 713/200 |
| 2003/0041266 A1 * | 2/2003 | Ke et al. | 713/201 |
| 2003/0097557 A1 * | 5/2003 | Tarquini et al. | 713/153 |
| 2003/0123447 A1 * | 7/2003 | Smith | 370/394 |
| 2003/0123452 A1 * | 7/2003 | Cox et al. | 370/395.43 |
| 2003/0135753 A1 | 7/2003 | Batra | |
| 2003/0191937 A1 | 10/2003 | Balissat et al. | |
| 2003/0204632 A1 * | 10/2003 | Willebeek-LeMair et al. | 709/249 |
| 2004/0005061 A1 | 1/2004 | Buer et al. | |
| 2004/0044891 A1 | 3/2004 | Hanzlik et al. | |
| 2004/0062399 A1 | 4/2004 | Takase | |
| 2004/0123139 A1 * | 6/2004 | Aiello et al. | 713/201 |
| 2004/0160903 A1 | 8/2004 | Gai et al. | |
| 2004/0268124 A1 | 12/2004 | Narayanan | |
| 2005/0010765 A1 | 1/2005 | Swander et al. | |
| 2005/0063352 A1 * | 3/2005 | Amara et al. | 370/338 |
| 2005/0066159 A1 | 3/2005 | Poussa et al. | |
| 2005/0125684 A1 | 6/2005 | Schmidt | |
| 2005/0138369 A1 | 6/2005 | Lebovitz et al. | |
| 2005/0149732 A1 | 7/2005 | Freeman et al. | |
| 2005/0190758 A1 | 9/2005 | Gai et al. | |
| 2006/0072748 A1 | 4/2006 | Buer | |
| 2006/0072762 A1 | 4/2006 | Buer | |
| 2007/0214502 A1 * | 9/2007 | McAlister | 726/15 |
| 2008/0127327 A1 * | 5/2008 | Carrasco | 726/15 |
| 2009/0034557 A1 * | 2/2009 | Fluhrer et al. | 370/474 |
| 2011/0013776 A1 * | 1/2011 | McAlister | 380/283 |

OTHER PUBLICATIONS

Demystifying the IPSec Puzzle, Chapter 9, "The Missing Puzzle Piece: Policy Setting and Enforcement" pp. 179-205.

* cited by examiner

VIRTUAL SECURITY INTERFACE

BACKGROUND OF THE INVENTION

Computer network traffic is normally sent unsecured without encryption or strong authentication of the sender and receiver. This allows the traffic to be intercepted, inspected, modified, or redirected. Either the sender or the receiver can falsify their identity. In order to allow private traffic to be sent in a secured manner, a number of security schemes have been proposed and are in use. Some are application dependent, as with a specific program performing password authentication. Others, such as (TLS), are designed to provide comprehensive security to whole classes of traffic such as web pages (e.g., Hypertext Transfer Protocol (HTTP)) and file transfers, e.g., File Transfer Protocol (FTP).

Internet Security (IPsec) was developed to address a broader security need. As the majority of network traffic today is over Internet Protocol (IP), IPsec was designed to provide encryption and authentication services to this type of traffic regardless of the application or transport protocol. A standard IPsec datagram in tunnel mode can be used to provide Virtual Private Networking (VPN) and other security functions. In standard IPsec tunnel mode processing, the entire content of an original IP packet is encrypted and encapsulated inside another IP packet, namely, an IPsec packet. The IPsec packet is sealed with an Integrity Check Value (ICV) which authenticates a sender and prevents modification of the packet in transit.

Unlike a standard IP packet or other types of IPsec packets (e.g., transport mode packets), an IPsec tunnel mode packet has its original IP header encapsulated and encrypted as well as its original IP payload. This allows a source and a destination address of the IPsec tunnel mode packet to be different from those of the encapsulated IP packet. This in turn permits a secure IP tunnel to be formed through which the IPsec tunnel packet is routed.

When the IPsec tunnel mode packet arrives at its destination it goes through an authentication check. The authentication check includes validation of the IPsec tunnel mode packet header, and an authentication of the IP packet. The authentication of the IP packet includes performing a cryptographic hash such as MD5 or SHA-1. A mismatched hash value is used to identify whether the IP packet was damaged in transit or whether an improper key was used. When the IPsec header of the IPsec tunnel mode packet is validated, the IPsec header is stripped off and the original IP packet is restored in the clear, including the original header with original source and destination addresses.

Standard IPsec implementations require IP addresses be included in the ICV. Consequently, any modification (e.g., translation) to an IP address will cause the integrity check to fail when verified by a recipient. Since the ICV incorporates a secret key which is unknown by intermediate networking devices, such as an intermediate router used for network load balancing or resilient routing, in an event such a device modifies an IP address the device is unable to re-compute the ICV. Accordingly, standard IPsec implementations are not compatible with several common networking functions. Such IPsec implementations are limited to networking situations where a source and a destination networks are reachable without modifying an IP address.

A solution is described in a U.S. Provisional Patent Application No. 60/756,765 entitled SECURING NETWORK TRAFFIC USING DISTRIBUTED KEY GENERATION AND DISSEMINATION OVER SECURE TUNNELS, filed Jan. 6, 2006, assigned to CipherOptics, Inc. This solution overcomes the limitation by copying an IP header of an outgoing packet in an outer header of an IPsec tunnel mode packet. More specifically, an original source IP address and an original destination IP address of an encrypted outgoing packet are copied to the outer header of the IPsec tunnel mode packet. By copying the addresses to the outer header resulting in an IPsec-like packet, there is greater flexibility in handling such a packet. The IPsec-like packet is suited for a number of networking situations previously unsuitable for an IPsec tunnel mode packet.

For example, in a network situation, such as network load sharing and resilient routing where more than one physical router receives a packet, the packet travels down different network paths and between different internetworking devices. By copying the original source IP address and the original destination IP address of the encrypted outgoing packet copied to the outer header, the IPsec-like packet is routed according to its original addresses. That is, the IPsec-like packet is not exclusively routed according to IPsec tunnel mode addresses of the IPsec tunnel mode packet.

This solution by its very nature makes a secured network known. There are several instances where it is desirable or even necessary that the secured network is unknown or is otherwise hidden. One such instance is network security. Typically, packets from one secured network to another secured network traverse an unsecured network. Once a packet leaves a secured network and enters into an unsecured network, the packet can be intercepted and inspected, e.g., using a packet analyzer or "sniffer." Inspecting an IPsec-like packet with a copied source address and a copied destination address reveals identities of both the first secured network and the second secured network. As such, an implementation other than copying an IP header of an outgoing packet to an outer header of an IPsec tunnel mode packet is desirable in terms of providing network security.

Another such instance is address space conservation. Typically, a secured network has a limited number of available addresses. To conserve addresses, a network secured network uses private addresses. By agreement private addresses are freely usable by any network with the exception that packets addressed with private addresses cannot be routed in a public network, e.g., the Internet. That is to say, the use of private addresses is limited to a private network, e.g., a remote office. As such, an implementation other than copying an IP header of an outgoing packet to an outer header of an IPsec tunnel mode packet is necessary in terms of conserving addresses.

SUMMARY OF THE INVENTION

For purposes of explaining aspects of various embodiments of the present invention, the following terms are defined and used herein:

"Securing data" (or "traffic") refers to applying a specific type of encryption and authentication to data. Applying encryption to data involves encrypting data in instances when data is unencrypted or "in the clear", and de-encrypting data in instances when data is encrypted.

"Secured data" (or "traffic") refers to data secured by the application of a specific type of encryption and authentication. In some instances, secured data refers to encrypted and authenticated data, e.g., data traversing an unsecured network. In other instances, secured data refers to unencrypted and unauthenticated data, e.g., data in a secured network.

A "secure tunnel" between two devices ensures that data passing between the two devices is secured.

A "secured network" is a network in which data to and from the network is secured.

A "security policy" (or simply "policy") for a secure tunnel defines data (or "traffic") to be secured by a source IP address, a destination IP address, a port number and/or a protocol. The security policy also defines a type of security to be performed.

A "security key" for a secure tunnel is a secret information used to encrypt or to decrypt (or to authenticate and to verify) data in one direction of traffic in the secure tunnel.

Embodiments of the present invention provide a technique for hiding and securing a network. In one embodiment, the technique comprises of: i) establishing at a first security interface a first secured network connection between a first secured network and a second secured network, the first secured network connection established for a first packet which is addressed to a virtual security interface and which is destined for the second secured network, and ii) responding to a network condition by establishing at a second security interface at least one second secured network connection between the first secured network and the second secured network, the at least one second secured network connection established for a second packet which is addressed to the virtual security interface and which is destined for the second secured network.

In an alternative embodiment, the technique further comprises of sharing a security policy between the first security interface and the second security interface, the first secured network connection and the at least one second secured network connection established according to the shared security policy.

In another embodiment, the technique responds to a network condition by offloading a network security burden from a first secured network connection to an at least one second secured network connection.

In yet another embodiment, the technique responds to a network condition by balancing a network load from a first secured network connection to an at least one second secured network connection.

In still another embodiment, the technique responds to a network condition by resiliently routing from a first secured network connection to an at least one second secured network connection.

In an embodiment, the technique establishes a secured network connection between a first secured network and a second secured network by securing a packet addressed to a virtual security interface.

In another embodiment, the technique secures a packet addressed to a virtual security interface by de-encapsulating and de-encrypting the packet according to a shared security policy.

In yet another embodiment, the technique establishes a secured network connection between a first secured network and a second secured network by securing a packet addressed from the first secured network.

In still yet another embodiment, the technique secures a packet addressed from a secured network by encrypting the packet according to a shared security policy and encapsulating the encrypted packet in a tunnel packet, a source of the tunnel packet is a virtual security interface.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

Another embodiment of the present invention, a computer program product, includes a non-transitory machine-accessible and readable medium embodying computer usable code for hiding and securing a network. The computer program product includes: i) computer usable program code for establishing at a first security interface a first secured network connection between a first secured network and a second secured network, the first secured network connection established for a first packet which is addressed to a virtual security interface and which is destined for the second secured network; and ii) computer usable code for responding to a network condition by establishing at a second security interface at least one second secured network connection between the first secured network and the second secured network, the at least one second secured network connection established for a second packet which is addressed to the virtual security interface and which is destined for the second secured network.

DETAILED DESCRIPTION OF THE INVENTION

A description of preferred embodiments of the invention follows.

Figure 1:
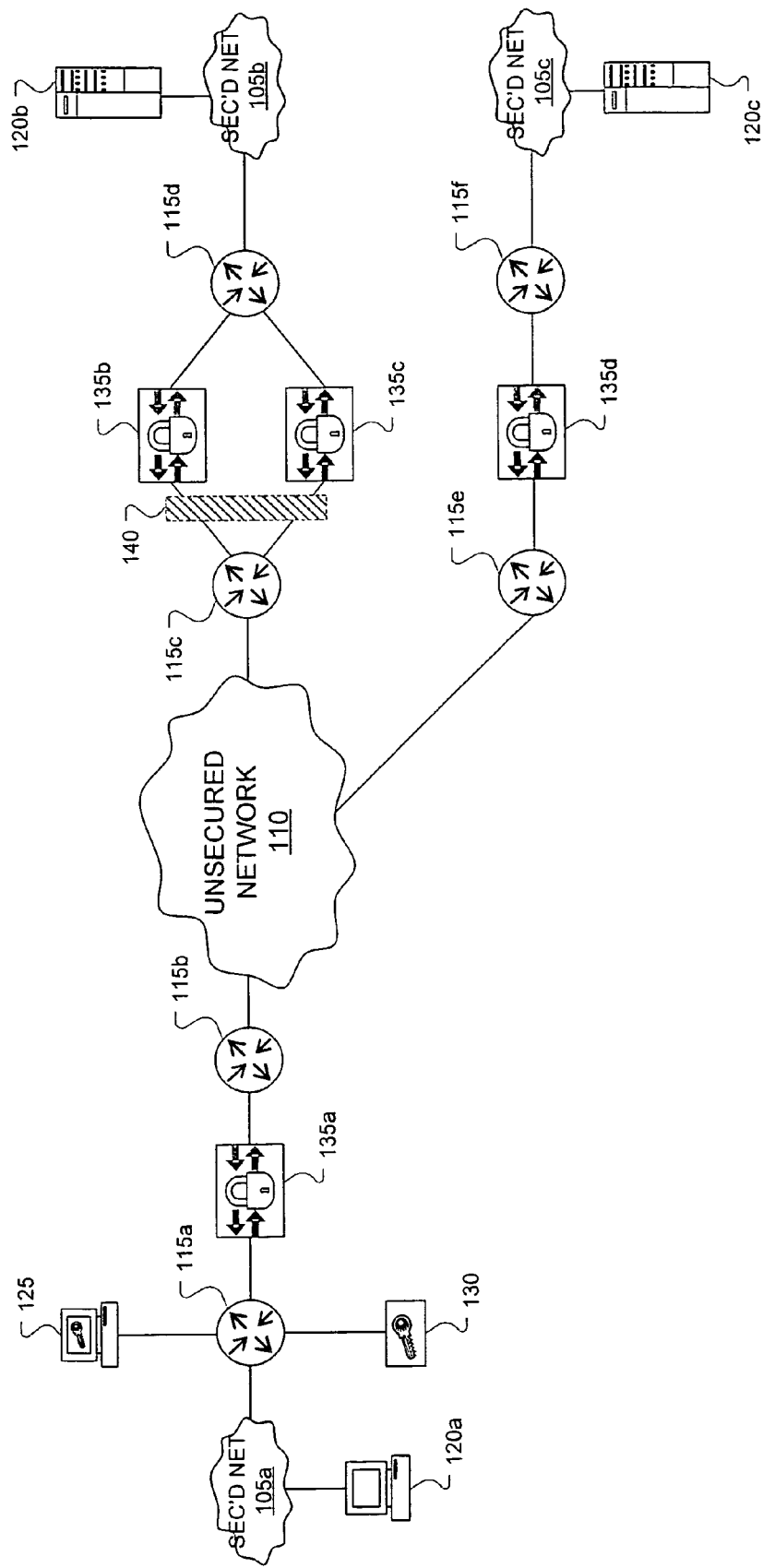
FIG. 1 is a network diagram of an example wide area data communications network implementing an embodiment of the present invention.

FIG. 1 illustrates an example wide area data communications network 100 implementing an embodiment of the present invention.

In the network 100 there are secured networks 105a, 105b, and 105c, generally 105. Secured networks 105 may be may be subnets, physical LAN segments or other network architectures. What is important is the secured networks 105 are logically separate from one another and from other secured networks.

The secured network 105 may be a single office of an enterprise which has only a few computers. In contrast, the secured network 105 may be a large building, complex or campus which has many computers. For example, the secured network 105a is in a west coast headquarters office located in Los Angeles and the secured network 105b is an east coast sales office located in New York City.

In the network 100, there is also an unsecured network 110. The unsecured network 110 is, for example, the Internet. The network 100 is implemented or otherwise deployed in such a fashion which requires a secure network connection from one secured network (e.g., 105a) to another secured network (e.g., 105b) to traverse an unsecured network, e.g., 110. One or more tunnels are used to traverse an unsecured network (discussed in greater detail below).

Continuing with FIG. 1, the secured networks 105 and unsecured network 110 are networked together with inter-network devices 115a, 115b, 115c, 115d, 115e, and 115f, generally 115. The inter-network devices 115 are, for example, routers or switches. On the secured network 105 are end nodes 120a, 120b, and 120c, generally 120. The end nodes 120 may be typical client computers, such as Personal Computers (PCs), workstations, Personal Digital Assistants (PDAs), digital mobile telephones, wireless network enabled devices and the like. Additionally, the end nodes 120 may also be file servers, video set top boxes, other data processing machines, or indeed any other device capable of being networked from which messages are originated and to which message are destined.

Communications between the end nodes 120 typically take the form of data packets in the well known Internet Protocol (IP) packet format. As is well known in the art, an IP packet may be encapsulated by other networking protocols such as the Transmission Control Protocol (TCP), the User Datagram Protocol (UDP), or other lower level and higher level networking protocols.

Still referring to FIG. 1, in the network 100, a [P] [A] Management System (PAMS) function 125 and a Key Authority Point (KAP) function 130, and Policy Enforcement Points (PEPs) 135a, 135b, 135c, and 135d, generally 135, secure data packets to and from the end nodes 120 according to security policies.

Recall a security policy (or simply a "policy") defines data packets (or "traffic") to be secured by a source IP address, a destination IP address, a port number and/or a protocol. The security policy also defines a type of security to be performed on the traffic.

The PAMS function 125 is used by an administrative user (e.g., a network administrator) to input and configure security policies. Additionally, the PAMS function 125 stores and provides access to security policies used by other elements or functions of the network 100.

The KAP function 130 generates and distributes "secret data" known as a security keys to the PEPs 135. Further details of a preferred embodiment for generating and distributing security keys are contained in a co-pending U.S. Provisional Patent Application No. 60/756,765 entitled SECURING NETWORK TRAFFIC USING DISTRIBUTED KEY GENERATION AND DISSEMINATION OVER SECURE TUNNELS, filed Jan. 6, 2006, assigned to CipherOptics, Inc., and which is hereby incorporated by reference in its entirety.

The PEP function 135 enforces security policies. According to a security policy, the PEP function 135 secures or otherwise establishes a secured network connection to a secured network. In this way, the PEP function 135 acts as an security interface to the secured network. Presently different, packets destined to the secured network are sent through the PEP function 135. Likewise, packets sourced from the secured network are sent through the PEP function 135.

FIG. 1 illustrates the network 100 has having a single PAMS function (e.g., 125) and a single KAP function (e.g., 130) immediately networked to the secured network 105a. One skilled in the art, however, will readily recognize the network configuration of network 100 is merely an example and other network configurations are within the contemplation the present invention. For example, in another example network there are more than one PAMS function and more than one KAP function distributed throughout a network and coordinated by a central function(s).

Continuing with FIG. 1, packets between the secured networks 105a and 105b are secured by the PEPs 135b and 135c (PEP-B and PEP-C, respectively). Recall securing implies both encrypting data in transit and authenticating that data to ensure that the data has not been manipulated in transit. For purposes of explaining aspects of embodiments of the present invention, the secured network 105a is referred to hereinafter as a secured remote network and the secured network 105b is referred to hereinafter as a secured local network. In this way, the PEPs 135b and 135c are said to have an interface (not shown) to a secured remote network (e.g., 105a) and an interface (not shown) to the secured local network 105b.

The interfaces to a secured local network are represented as a virtual security interface 140. The virtual security interface 140 is not a physical interface, but rather a logical interface. As such, and as will be described in greater detail below, the virtual security interface 140 represents a plurality of interfaces to a secured local network.

Figure 2:
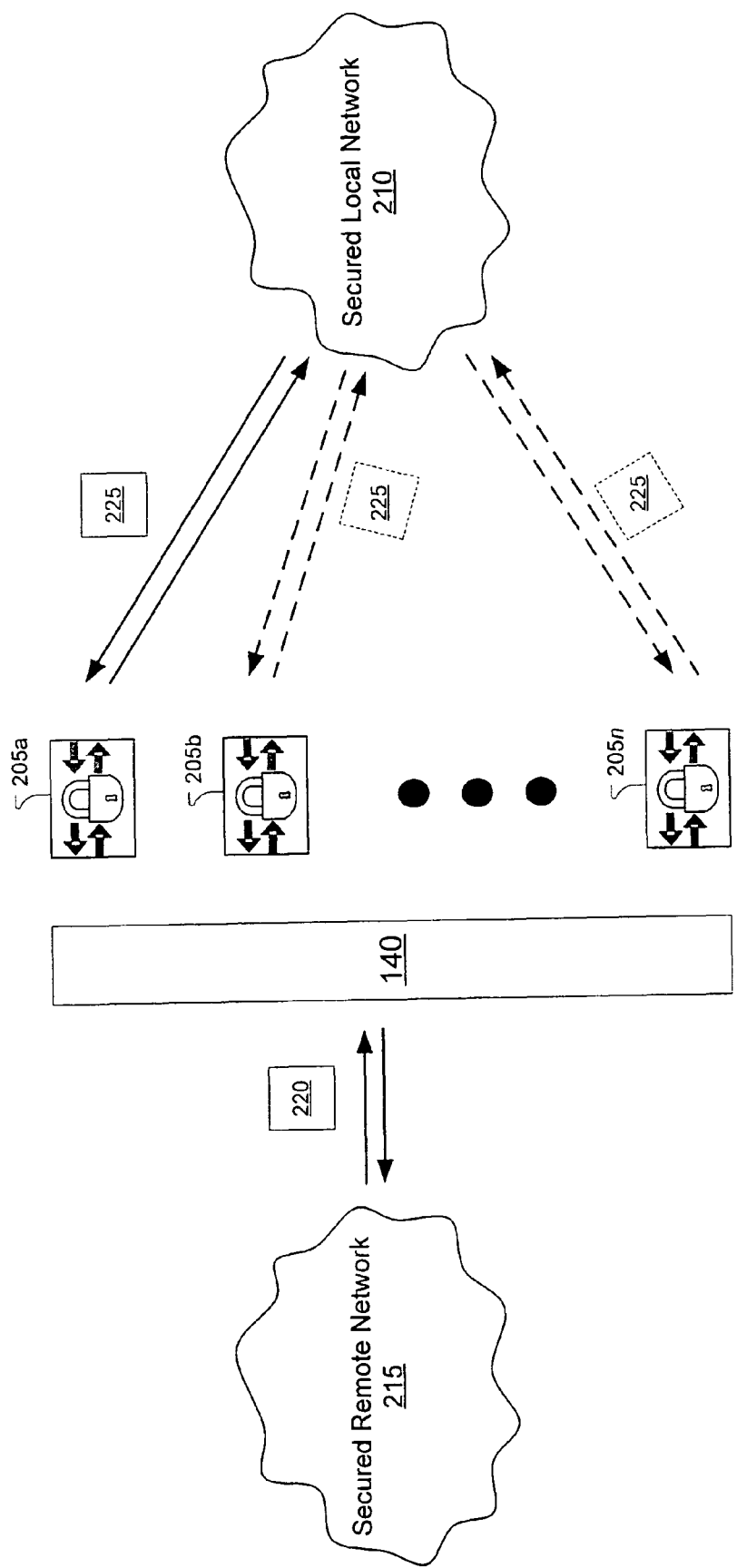
FIG. 2 is a block diagram of an example virtual security interface in accordance with an embodiment of the present invention.

FIG. 2 further illustrates the virtual security interface 140 of FIG. 1. In FIG. 2, there are n number of security interfaces 205a, 205b . . . 205n (generally 205) to a secured local network 210. The security interfaces 205 secure or otherwise establish secured network connections between the secured local network 210 and a secured remote network 215. In particular, the security interfaces 205 secure packets destined for the secured local network 210 which are sent from the secured remote network 215, and vice versa.

The virtual security interface 140 logically represents the security interfaces 205. Packets addressed to the virtual security interface 140 are in reality destined for the security interfaces 205. The following example illustrates the virtual security interface logically representing the security interfaces 205.

From the secured remote network 215, a packet 220 is sent. The sent packet 220 is addressed to the virtual security interface 140. Since the packet 220 is addressed to the virtual security interface 140 and not a particular security interface, the packet is destined for any of the security interfaces 205. In some instances the packet 220 is destined for any number of the security interfaces 205 (described later). Consequently, any of the security interfaces 205 secure the packet 220 resulting in a secured packet 225.

By way of example, in FIG. 2, the packet 220, addressed to the virtual security interface 140, is destined for the security interface 205a. The security interface 205a secures the sent packet 220 resulting in the secured packet 225. The broken lines denote the packet 220 being alternatively destined for a security interface other than the security interface 205a. As illustrated, the packet 220 destined for the security interface 205b is secured by that security interface, and so on.

An identity, indeed a presence of a secured network is known because of a security interface(s) to the secured network. Hiding the security interface to the secured network effectively hides the secured network. In this way, addressing a packet to a virtual security interface rather than the security interface to the secured network, the identity or presence of the secured network cannot be ascertained by inspecting the packet. As such, the secured network is hidden.

Figure 3A:
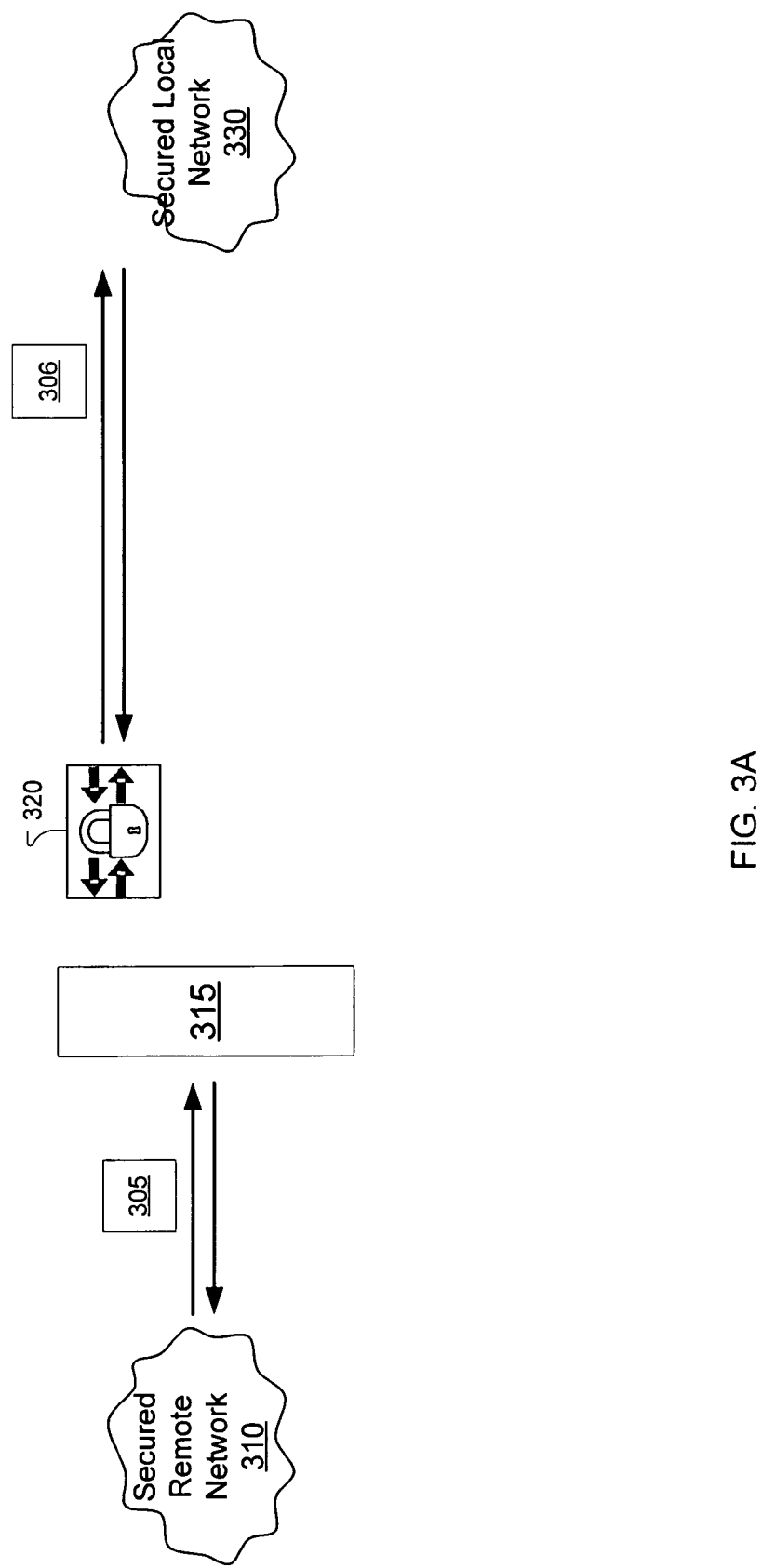
FIG. 3A is a block diagram illustrating establishing at a security interface a secured network connection between a first secured network and a second secured network in accordance of an embodiment of the present invention.

FIG. 3A illustrates establishing a first secured network connection at a first security interface. In FIG. 3A, a packet 305 from a secured remote network 310 is addressed to a virtual security interface 315. As previously described, packets addressed to a virtual security interface are secured by any security interface and any number of security interfaces. Since packets are addressed to the virtual security interface and not a particular security interface, it appears to an end node in the secured remote network 310 that a secured network connection is established at the virtual security interface. In actuality, one or more secured network connections between the secured remote network 310 and the secured local network 330 are established at the one or more security interfaces. In other words, the secured network connections actually established are transparent or otherwise hidden from an end node. More significantly, these connections are hidden from others in a network.

By way of example, in FIG. 3A, the packet 305, while addressed to the virtual security interface 315, is secured by a security interface 320. At the security interface 320, a first secured network connection between the secured remote network 310 and the secured local network 330 is established according to a security policy. The security policy states or otherwise defines a specific type of encryption and authentication to apply to packets between the secured remote network 310 and secured local network 330. The packet 305 is sent from the secured remote network 310 to the secured local network 330 using the established first secured network connection.

Securing the packet 305 results in a secured packet 306 destined for the secured local network 330. In some instances, the secured packet 306 is de-encrypted and authenticated, i.e., the packet is "in the clear." In other instances, the secured packet 306 is re-secured (e.g., re-encrypted) according to another security policy. While FIG. 3A illustrates establishing a single secured network connection between a secured remote network and a secured local network, there are several instances where more than one secured network connections are established.

Figure 3B:
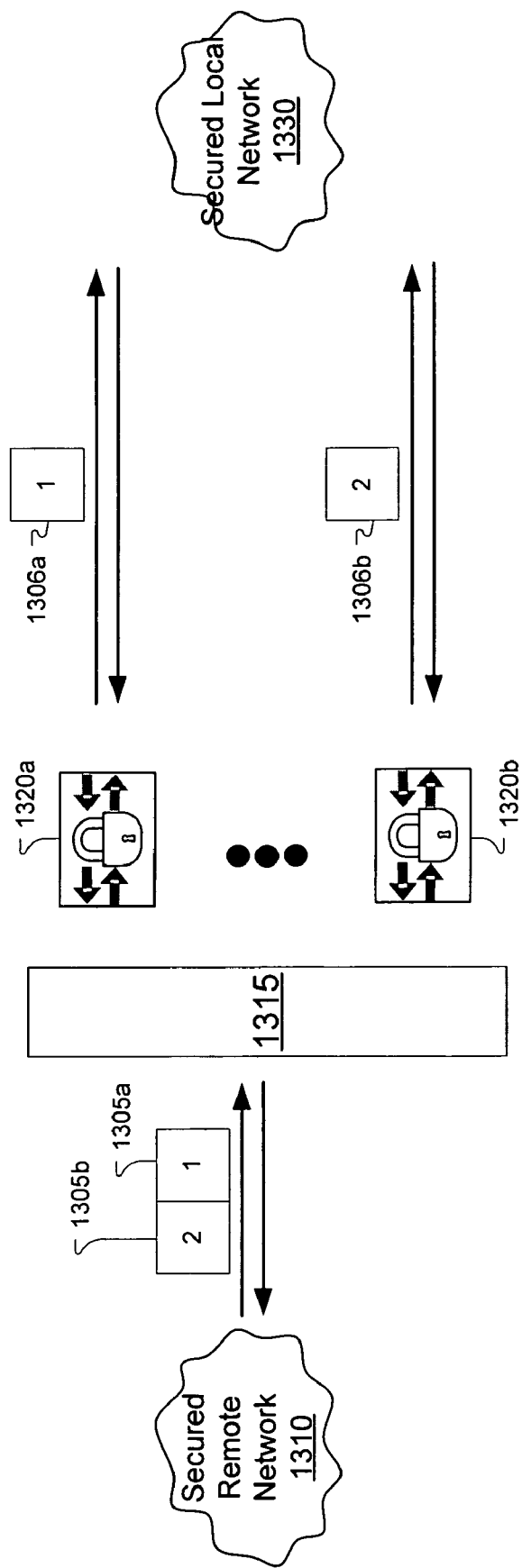
FIGS. 3B-3D are block diagrams illustrating responding to a various network conditions by establishing at a security interface a secured network connection between a first secured network and a second secured network.
Figure 3C:
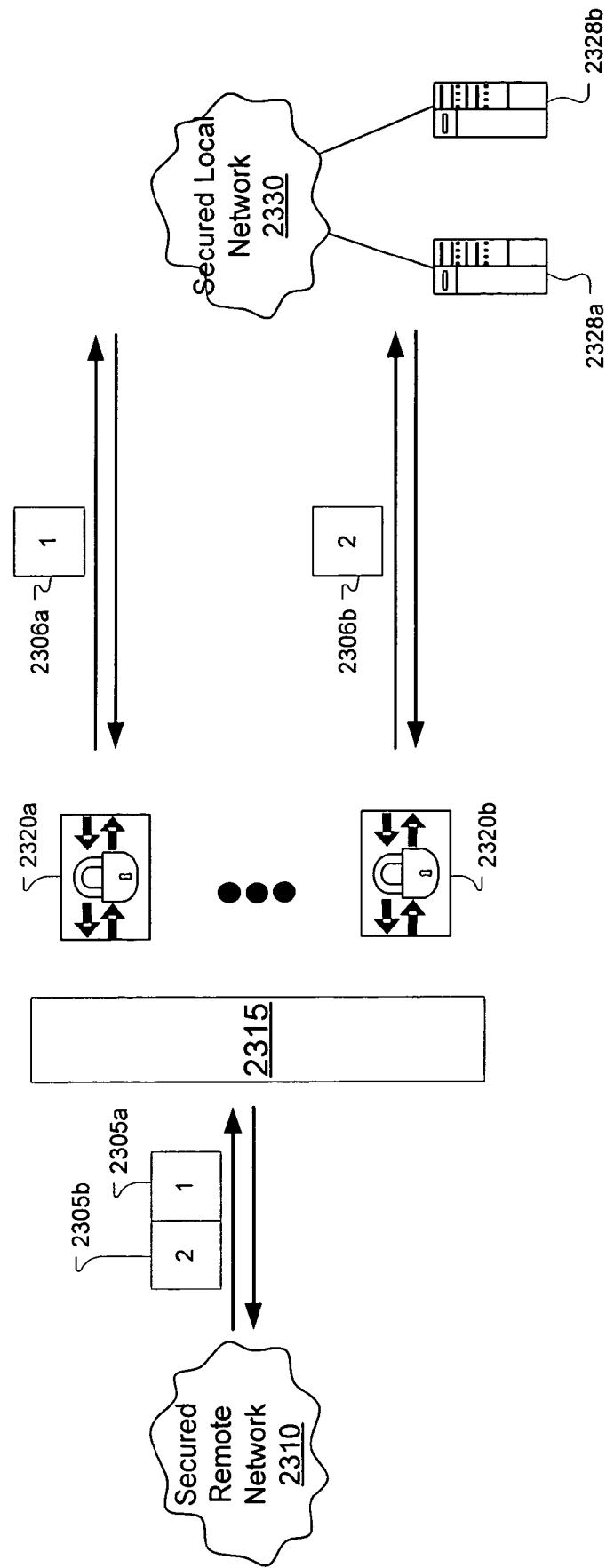
Figure 3D:
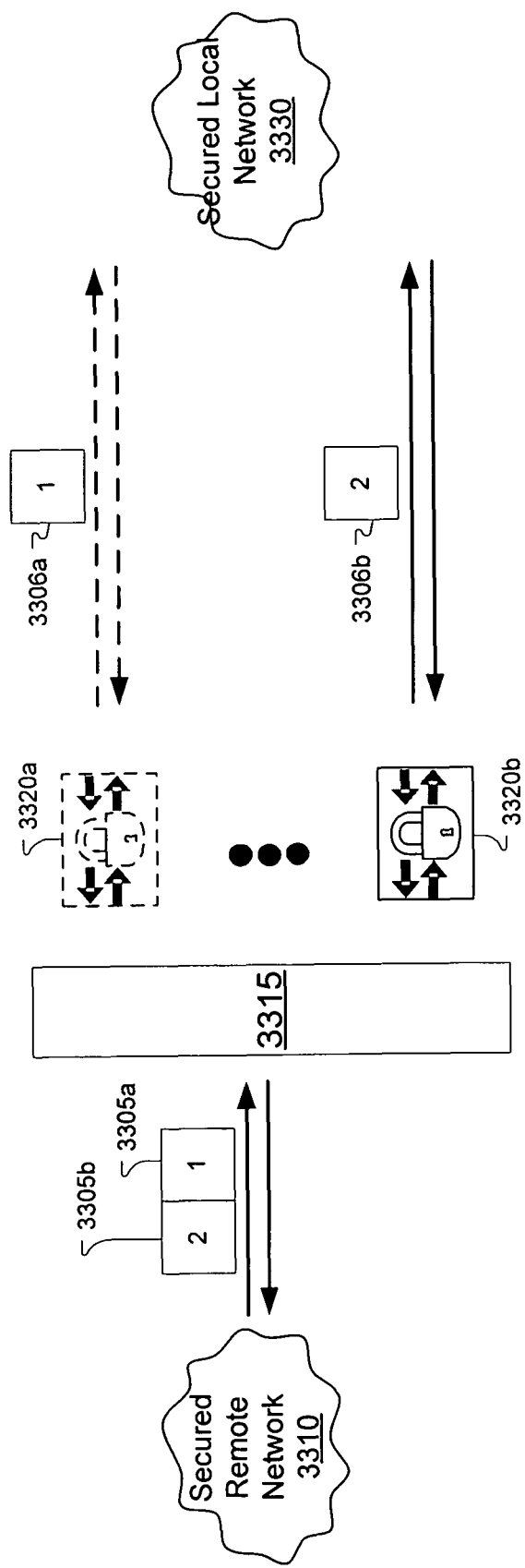

FIGS. 3B-3D illustrate various examples of responding to a network condition by establishing at least one second secured network connection. In FIG. 3B, packets 1305a and 1305b from a secured remote network 1310 are addressed to a virtual security interface 1315. The packet 1305a is secured by a first security interface 1320a.

At the first security interface 1320a, a first secured network connection between the secured remote network 1310 and a secured local network 1330 is established according to a security policy. The security policy states or otherwise defines a specific type of encryption and authentication to apply to packets between the secured remote network 1310 and the secured local network 1330. Using the established first secured network connection, the packet 1305a is sent from the secured remote network 1310 to the secured local network 1330. A secured packet 1306a is received by the secured local network 1330.

The packet 1305b, however, is not secured by the first security interface 1320a. In this example, the first security interface 1320a is busy securing the packet 1305a and is unable to secure additional packets. That is to say, the first security interface 1320a is overloaded or otherwise overburdened with providing security. In order to offload or otherwise alleviate this burden, the packet 1305b is secured by a second security interface 1320b.

At the second security interface 1320b, a second secured network connection between the secured remote network 1310 and the secured local network 1330 is established according to a security policy. The security policy states or otherwise defines a specific type of encryption and authentication to apply to packets between the secured remote network 1310 and secured local network 1330. Using the established second secured network connection, the packet 1305b is sent from the secured remote network 1310 to the secured local network 1330. A secured packet 1306b is received by the secured local network 1330.

In this way, an at least one second secured network connection is established in response to a network security overload condition. Presently differently, an at least second secured network connection is established to offload a network security burden from one security interface (e.g., the first security interface 1320a) to another security interface, e.g., the second security interface 1320b.

In FIG. 3C, packets 2305a and 2305b from a secured remote network 2310 are addressed to a virtual security interface 2315. The packet 2305a is secured by a first security interface 2320a. At the first security interface 2320a, a first secured network connection 2325a is established between the secured remote network 2310 and a secured local network 2330 according to a security policy. The security policy states or otherwise defines a specific type of encryption and authentication to apply to packets between the secured remote network 2310 and secured local network 2330. Using the established first secured network connection, the packet 2305a is sent from the secured remote network 2310 to the secured local network 2330. A secured packet 2306a is received by an end node-A 2328a on the secured local network 2330.

The packet 2305b, however, is not secured by the first security interface 2320a. In this example, in contrast to packet 2305a, the packet 2305b is to be handled or otherwise processed not by the end node-A 2328a, but by an end node-B 2328b on the secured local network 2230. In other words, packets are not necessarily processed by a single end node, but be processed by additional end nodes.

In one instance, packets are processed by different end nodes depending on a type or a protocol of a packet. For example, a Hypertext Transport Protocol (HTTP) packet (e.g., a HTTP GET) is processed by an HTTP server, while a File Transfer Protocol (FTP) packet (e.g., a FTP PUT) is processed by an FTP server. In another instance, packets are processed by different end nodes in an event one end node is overloaded or otherwise burden and unable to process additional packets. In either case, network loads of two of more end nodes are balanced.

In order to balance network loads, the packet 2305b is secured by a second security interface 2320b. At the second security interface 2320b, a second secured network connection 2325b between the secured remote network 2310 and the secured remote network 2330 is established according to a security policy. The security policy states or otherwise defines a specific type of encryption and authentication to apply to packets between the secured remote network 2310 and secured local network 2330. Using the established second secured network connection, the packet 2305b is sent from the secured remote network 2310 to the secured local network 2330. A secured packet 2306b is received by an end node-B 2328b on the secured local network 2330.

In this way, an at least one second secured network connection is established in response to a network load balancing condition. Presently differently, an at least one second secured network connection is established to balance a network load of one end node (e.g., the end node-A 2328a) with a network load of another end node, e.g., the end node-B-A 2328b.

In FIG. 3D, packets 3305a and 3305b from a secured remote network 3310 are addressed to a virtual security interface 3315. The packet 3305a is secured by a first security interface 3320a. At the first security interface 3320a, a first secured network connection 3325a between the secured remote network 3310 and a secured local network 3330 is established according to a security policy. The security policy states or otherwise defines a specific type of encryption and authentication to apply to packets between the secured remote network 3310 and secured local network 3330. Using the established first secured network connection, the packet 3305a is sent from the secured remote network 3310 to the secured local network 3330. A secured packet 3306a is received by the secured local network 3330.

The packet 3305b, however, is not secured by the first security interface 3320a. In this example, the first security interface 3320a is malfunctioning or otherwise incapable of securing additional packets (denoted in FIG. 3D by broken lines). To prevent losing a packet, the packet 3305b is secured by a second security interface 3320b. At the second security interface 3320b, a second secured network connection 3325b between the secured remote network 3310 and the secured local network 3330 is established according to a security policy. The security policy states or otherwise defines a specific type of encryption and authentication to apply to packets between the secured remote network 1310 and secured local network 1330. Using the established second secured network connection, the packet 3305b is sent from the secured remote network 3310 to the secured local network 3330. A secured packet 3306b is received by the secured local network 3330.

In this way, an at least one second secured network connection is established in response to a network failover condition. Presently differently, an at least second secured network connection is established to resiliently route from one security interface (e.g., the first security interface 3320a) to another security interface, e.g., the second security interface 3320b.

Figure 4:
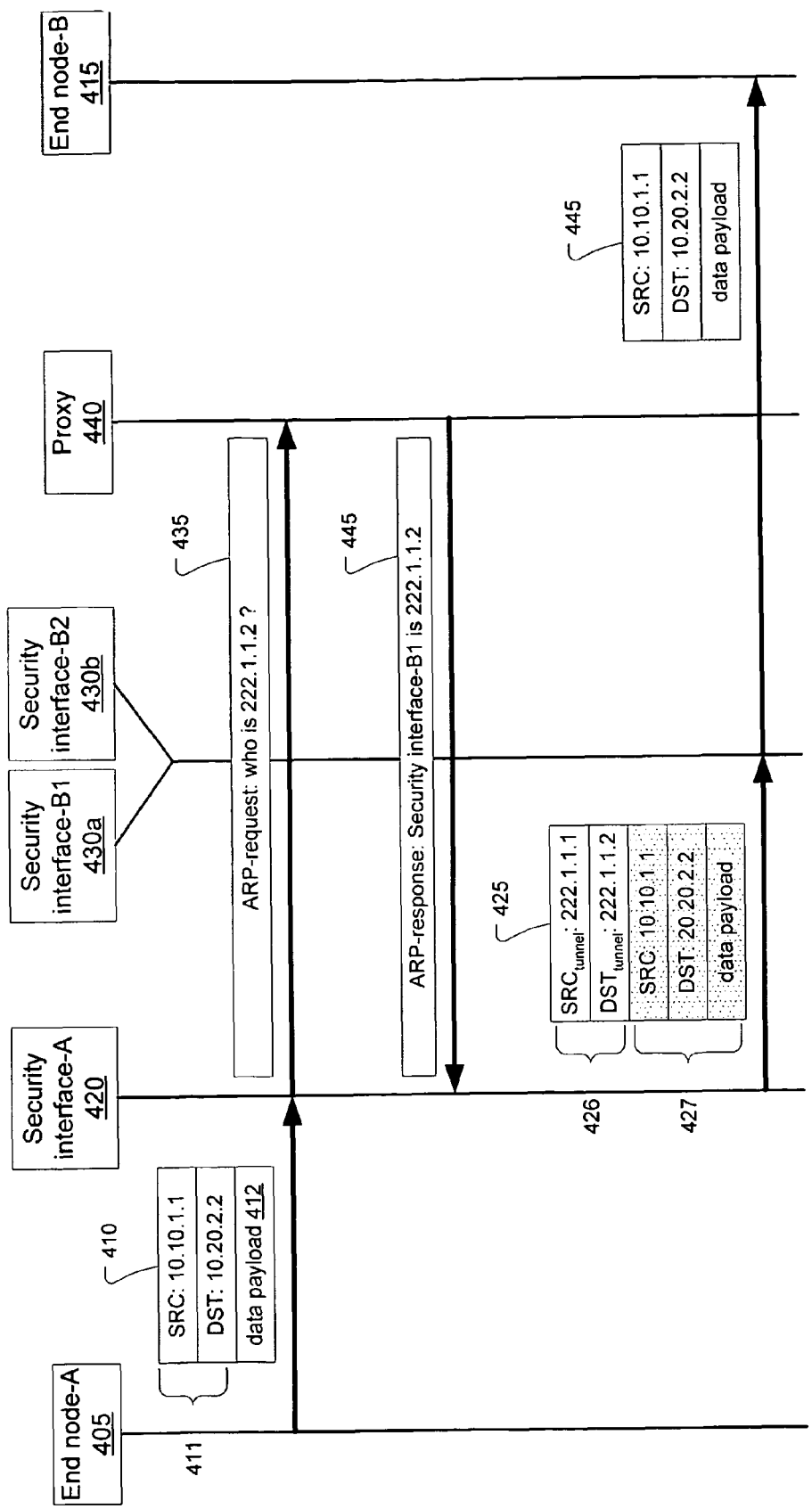
FIG. 4 is a packet diagram illustrating securing a packet sent from an end node on a secured remote network to an end node on a secured local network in accordance with an embodiment of the present invention.

FIG. 4, an end node-A 405 on a secured remote network sends an Internet Protocol (IP) packet 410 to an end node-B 415 on a secured local network. The IP packet 410 has at least an IP header 411 and an IP payload 412. The IP header 411 has at least a source IP address of the end node-A 405 and a destination IP address of the end node-B 415. The IP packet 410 is secured by a security interface-A 420 according to a security policy. The security policy states or otherwise defines that data between a secured remote network and secured local network is to be secured by a specific type of encryption and authentication. The IP packet 410 is encrypted and encapsulated inside an IP tunnel packet 425. The IP tunnel packet 425 has at least an IP tunnel header 426 and an encrypted payload 427. The IP tunnel header 426 has at least a tunnel source IP address of the security interface-A 420 and a tunnel destination IP address of a virtual security interface (not shown).

In order for the security interface-A 420 to send the IP tunnel packet 425 to the virtual security interface, a physical layer address of the virtual security interface must be resolved. This is accomplished, for example, with the well-known Ethernet Address Resolution Protocol (ARP). See Request For Comments (RFC) 826. The security interface-A 420 broadcasts an ARP-request 435 asking for a physical layer address of the virtual security interface. Recall, the virtual security interface is not a physical interface, but a logical representation of one or more security interfaces to a secured local network. See FIG. 1. As such, the ARP-request 435 may be answered with a physical address of one of several security interfaces.

By way of example, in FIG. 4, the virtual security interface logically represents a security interface-B1 430a and a security interface-B2 430b. The security interface-B1 430a and the security interface-B2 430b, however, do not answer to the ARP-request 435. That is to say, the ARP-request 435 is "transparent" to the security interface-B1 430a and the security interface-B2 430b, and "passes through" the security interface-B1 403a and the security interface-B2 430b. In this example, the ARP-request 435 is answered by a proxy 440. The proxy 440 may be a network device (e.g., a router), a computer or for that matter any device or process capable for answering an ARP-request with a physical address which is not its own. In this example, the proxy 440 answers with an ARP-response 445 providing a physical address of the security interface-B2 430b. The proxy 440 could have answered with a physical address of the security interface-B1 430a. The physical address with which the proxy 440 actually answers with is not of importance. What is of significance, however, is an ARP-request for a physical address of a virtual security interface is answered with an ARP-response with a physical address of a security interface to a secured local network.

Continuing with FIG. 4, in this example, the address of the virtual security interface is resolved to the physical address of the security interface-B2 430b. Consequently, the IP tunnel packet 425 is secured by the security interface-B2 430b and not the security interface-B1 430a. Note, in an event the virtual security interface is resolved to the physical address of the security interface-B1 430a, the IP tunnel packet 425 is secured by the security interface-B1 430a and not the security interface-B2 430b. Resuming the prior example, the security interface-B2 430b de-encapsulates the IP tunnel packet 425 by stripping off or otherwise removing the IP tunnel header 426. The security interface-B2 430b de-encrypts the encrypted payload 427. With the IP tunnel packet 425 de-encapsulated and de-encrypted, a secured IP packet 445 is destined for the end node-B 415.

Figure 5:
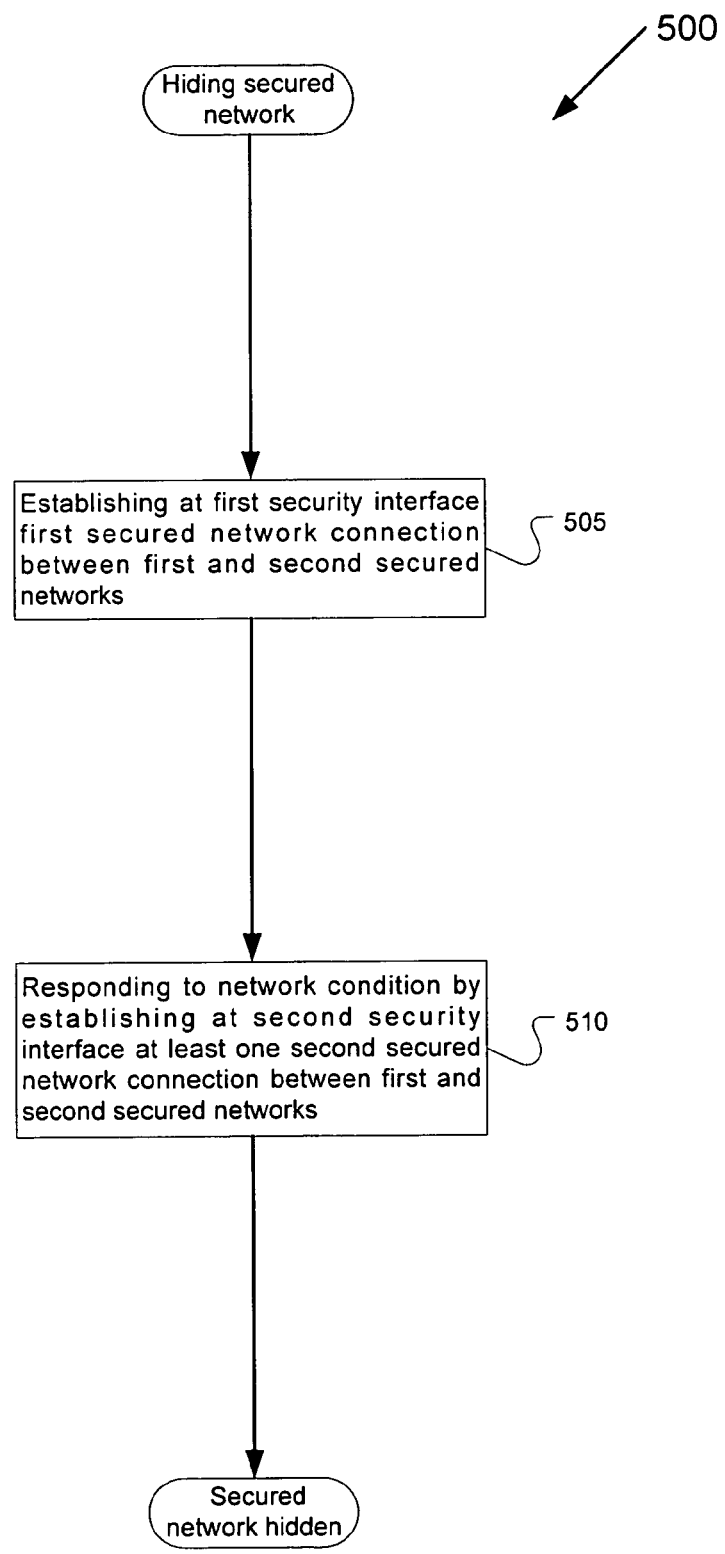
FIG. 5 is a flow chart for an example process for hiding and securing a network in accordance with an embodiment of the present invention.

FIG. 5 illustrates an example process 500 for hiding and securing a network. The process 500 establishes (505) a first secured network connection between a first secured network and a second secured network. The first secured network connection is established for a first packet which is addressed to a virtual security interface and which is destined for the second secured network.

The process 500 responds (510) to a network condition by establishing at least one second secured network connection between the first secured network and the second secured network. The at least one second secured network connection is established for a second packet which is addressed to the virtual security interface and which is destined for the second secured network.

Figure 6:
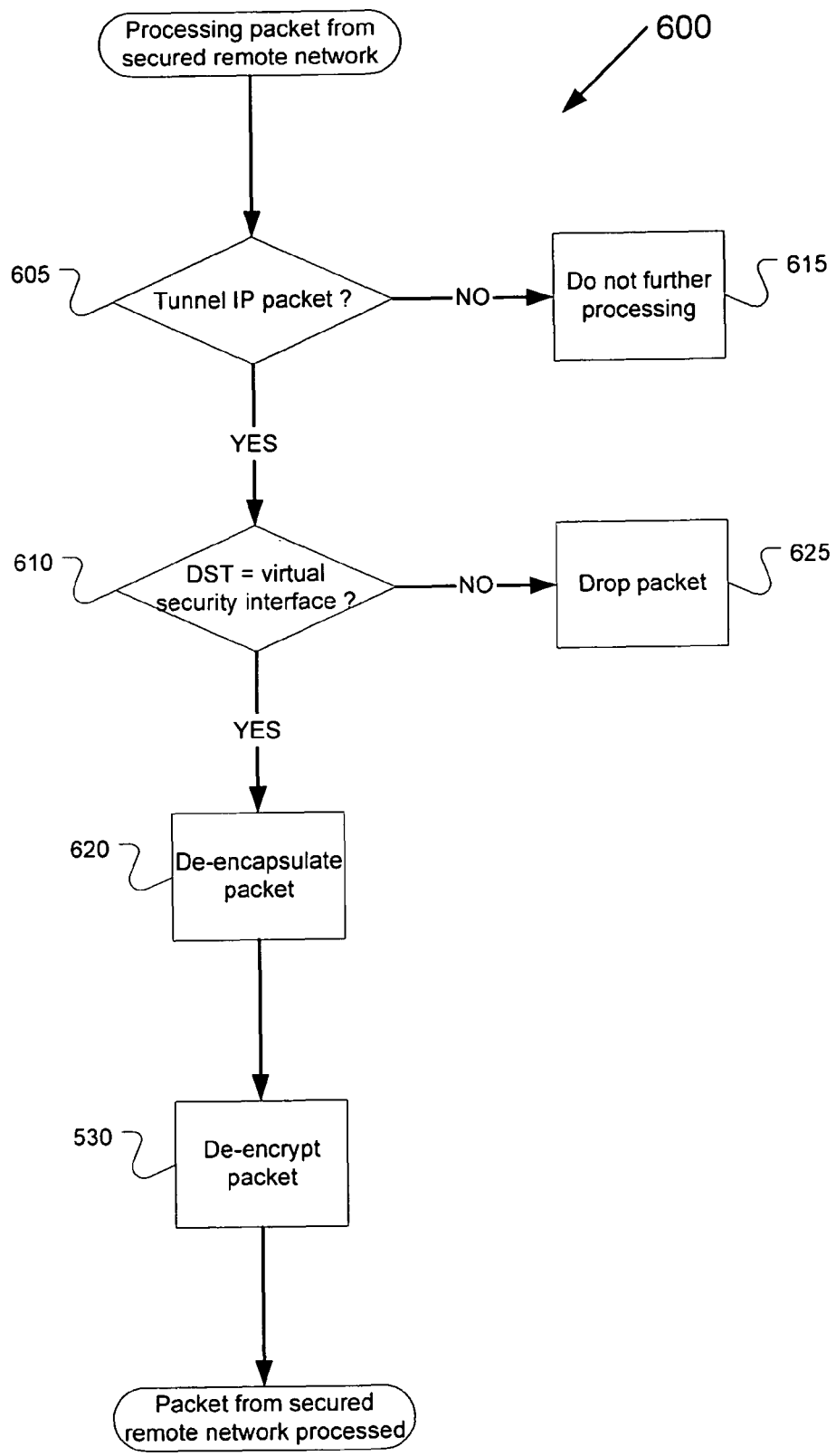
FIG. 6 is a flow chart of an example process processing a packet from a secured remote network in accordance with an embodiment of the present invention.

FIG. 6 illustrates an example process 600 processing a packet from a secured remote network. The process 600 determines (605) whether the packet is a tunnel IP packet. If the process 600 determines (605) the packet is a tunnel IP packet, then the process 600 determines (610) whether the tunnel destination of the tunnel IP packet is a virtual security interface.

In an embodiment, the process 600 is configured with at least one security policy (not shown). The security policy indicates using an IP address of a virtual security interface for selectors associated with a packet. The security policy dictates an action to take with respect to a packet. For example, a packet is accepted for further processing, passed through without further processing or dropped. In this way, according to a security policy, whether a packet is addressed with the IP address of the virtual security interface determines whether a packet is further processed, is not further processed or is simply dropped.

In an alternative embodiment having more than one process 600, the security policy indicating using an IP address of a virtual security interface for selectors associated with packets, is distributed or otherwise disseminated to each process 600. Further details of a preferred embodiment for distributing security polices are contained in a co-pending U.S. Provisional Patent Application No. 60/813,766 entitled SECURING NETWORK TRAFFIC BY DISTRIBUTING POLICIES IN A HIERARCHY OVER SECURE TUNNELS, filed Jun. 14, 2006, assigned to CipherOptics, Inc., and which is hereby incorporated by reference in its entirety.

Retuning to FIG. 6, if the process 600 determines (610) that the tunnel destination of the tunnel IP packet is a virtual security interface, then the process 600 de-encapsulates (620) the packet. As described earlier in reference to FIG. 4, de-encapsulating a tunnel IP packet involves at least removing a tunnel IP header from a tunnel IP packet. The process 600 de-encrypts (630) the packet with a security key according to a security policy.

Recall, a security key is secret information used to encrypt or to de-encrypt data. In an embodiment having more than one process 600, the security key is distributed or otherwise disseminated to each process 600. Further details of a preferred embodiment for distributing security keys are contained in a co-pending U.S. Provisional Patent Application No. 60/756,765 entitled SECURING NETWORK TRAFFIC USING DISTRIBUTED KEY GENERATION AND DISSEMINATION OVER SECURE TUNNELS, filed Jan. 6, 2006, assigned to CipherOptics, Inc., and which is hereby incorporated by reference in its entirety.

Returning to the process 600, if the process 600 determines (605) the packet is not a tunnel IP packet (e.g., the ARP-request of FIG. 4), then the process 600 does not further process (615) the packet. In some instances, such as the one described in reference to FIG. 4, packets are transparent to the process 600. Presently differently, the process 600 is transparent to certain packet exchanges.

Returning to the process 600, if the process 600 determines (610) a tunnel destination of the tunnel IP packet is not a virtual security interface, then the process 600 drops (625) the packet.

Figure 7:
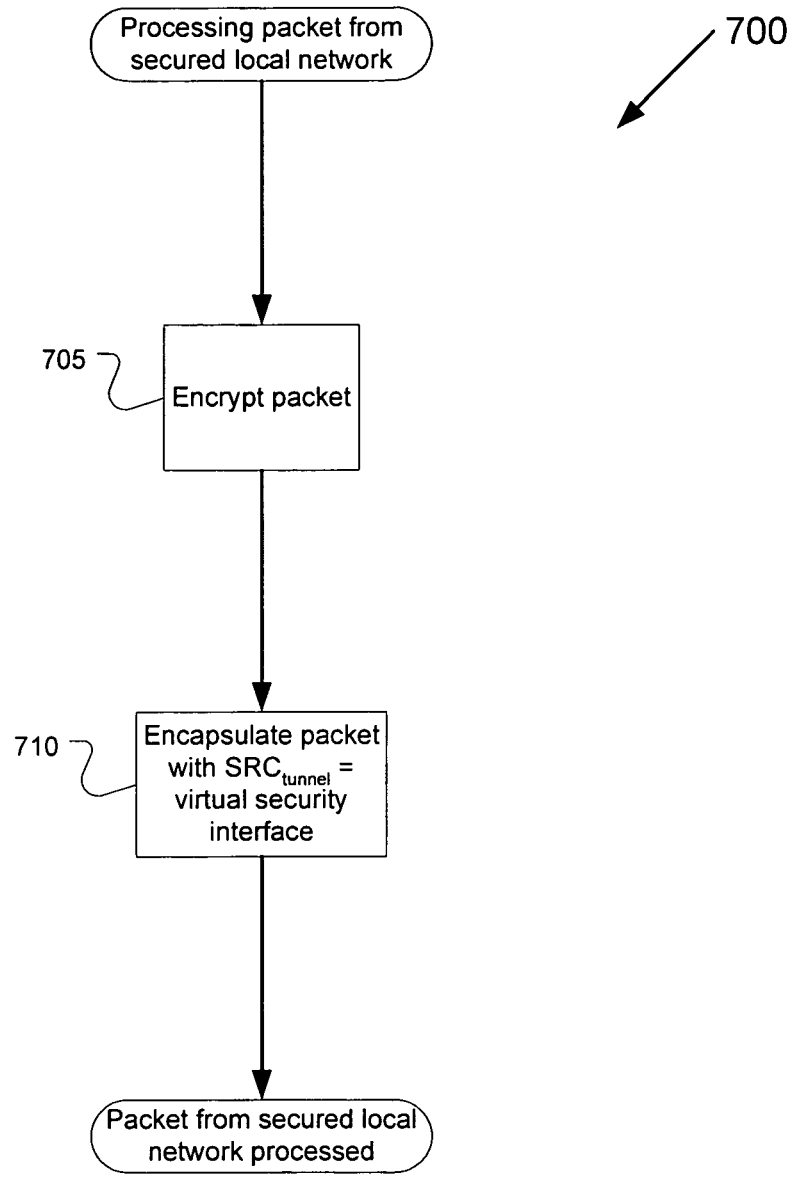
FIG. 7 is a flow chart of an example process processing a packet from a secured local network in accordance with an embodiment of the present invention.

FIG. 7 illustrates an example process 700 processing a packet from a secured local network. The process 700 encrypts (705) the packet using a security key according to a security policy. Recall, a security key is secret information used to encrypt or to de-encrypt data. In an embodiment having more than one process 700, the security key is distributed or otherwise disseminated to each process 700. Further details of a preferred embodiment for distributing security keys are contained in a co-pending U.S. Provisional Patent Application No. 60/756,765 entitled SECURING NETWORK TRAFFIC USING DISTRIBUTED KEY GENERATION AND DISSEMINATION OVER SECURE TUNNELS, filed Jan. 6, 2006, assigned to CipherOptics, Inc., and which is hereby incorporated by reference in its entirety.

Returning to FIG. 7, the process 700 encapsulates (710) the packet inside a tunnel IP packet according to a security policy. The tunnel IP packet has a tunnel source of a virtual security interface. In an embodiment of the present invention, the process 700 is configured with at least one security policy (not shown). The security policy indicates using an IP address of a virtual security interface as a tunnel source of the tunnel IP packet.

In an alternative embodiment having more than one process 700, a security policy indicating using an IP address of a virtual security interface as a tunnel source, is distributed or otherwise disseminated to each process 700. Further details of a preferred embodiment for distributing security polices are contained in a co-pending U.S. Provisional Patent Application No. 60/813,766 entitled SECURING NETWORK TRAFFIC BY DISTRIBUTING POLICIES IN A HIERARCHY OVER SECURE TUNNELS, filed Jun. 14, 2006, assigned to CipherOptics, Inc., and which is hereby incorporated by reference in its entirety.

Figure 8:
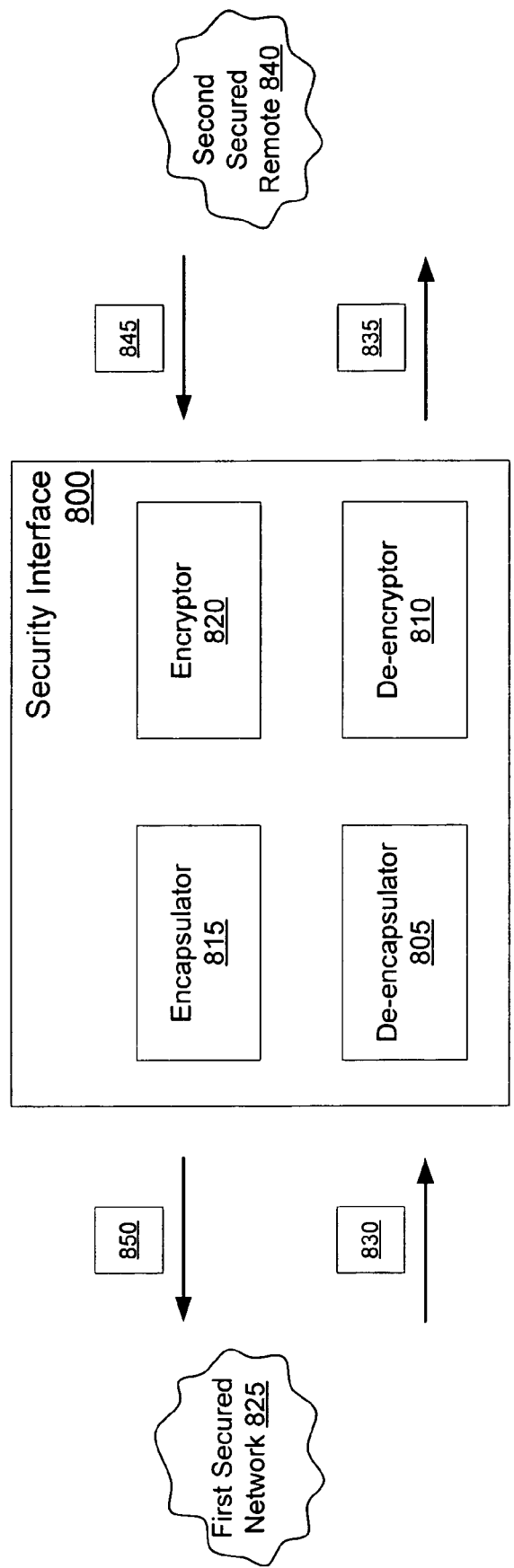
FIG. 8 is a block diagram of an example security interface in accordance with an embodiment of the present invention.

FIG. 8 illustrates an example security interface 800 with a de-encapsulator 805, a de-encryptor 810, an encapsulator 815 and an encryptor 820. The security interface 800 also includes an authenticator (not shown). From a first secured network 825, a tunnel packet 830 is sent. The tunnel packet 830 is addressed to a virtual security interface (not shown). The security interface 800, however, handles or otherwise processes the tunnel packet 830. The de-encapsulator 805 removes a tunnel header addressed to the virtual security interface. The authenticator authenticates the resulting de-encapsulated packet. The de-encryptor 810 de-encrypts the authenticated packet, resulting in a secured packet 835. The secured packet 835 is sent to a second secured network 840.

From the second secured network 840, a packet 845 is sent. The packet 845 is addressed from an end node in the second secured network 840. The security interface 800 handles or otherwise processes the packet 845. The encryptor 820 encrypts the packet 845. The authenticator authenticates the resulting encrypted packet. The encapsulator 815 adds a tunnel header addressed from the virtual security interface, resulting in a secured packet 850. The secured packet 850 is sent to the first secured network 825.

What is claimed is:

1. A network security method for exchanging IP packets and IP tunnel packets between secured networks, the method comprising:

determining first and second packets received from a first secured network are addressed to a virtual security interface that represents, logically, a plurality of security interfaces to a second secured network;

when the first and second packets are addressed to the virtual security interface, establishing at a first one of the plurality of security interfaces, a first secured network connection between the first secured network and the second secured network;

responding to a network condition by establishing, at a second one of the plurality of security interfaces, at least one second secured network connection between the first secured network and the second secured network, the at least one second secured network connection being logically the same as the first secured network connection;

sending the first and second packets to the second secured network using both the first and the at least one second secured network connections; and wherein the first and the at least one second secured network connections are established using the address of the virtual security interface to which the first and second packets are addressed rather than using the addresses of the first and second security interfaces to conserve addresses.

2. The method of claim 1 further comprising sharing a security policy between the plurality of security interfaces, the first secured network connection and the at least one second secured network connection established according to the shared security policy.

3. The method of claim 1 wherein the responding includes offloading a network security burden from the first secured network connection to the at least one second secured network connection.

4. The method of claim 1 wherein the responding includes balancing a network load from the first secured network connection to the at least one second secured network connection.

5. The method of claim 1 wherein the responding includes resiliently routing from the first secured network connection to the at least one second secured network connection.

6. The method of claim 1 wherein the establishings includes securing a packet from the first secured network to the second secured network.

7. The method of claim 6 wherein the securing includes de-encrypting and authenticating a packet from a secured network according a security policy.

8. The method of claim 6 wherein the securing includes encrypting and authenticating a packet from a secured network according a security policy.

9. The method of claim 1 wherein the establishing at the first one of the plurality of security interfaces includes de-encapsulating a tunnel packet addressed to the virtual security interface.

10. The method of claim 1 wherein the establishing at the second one of the plurality of security interfaces includes encapsulating a packet with a tunnel header addressed from the virtual security interface 11. A network security system to exchange IP packets and IP tunnel packets between secured networks, the system comprising:
a virtual security interface configured to determine whether first and second packets received from a first secured network are addressed to the virtual security interface that represents, logically, a plurality of security interfaces to a second secured network;
a first security interface configured to: i) establish a first secured network connection between the first secured network and a second secured network when the first and second packets are addressed to the virtual security, and ii) send the first packet to the second secured network using the first secured network connection;
a second security interface configured to: i) establish a second secured network connection between the first secured network and the second secured network in response to a network condition, the second secured network connection being logically the same as the first secured network connection, and ii) send the second packet to the second secured network using the second secured network connection; and
wherein the first and the at least one second secured network connections are established using the address of the virtual security interface to which the first and second packets are addressed rather than using the addresses of the first and second security interfaces to conserve addresses.

12. The network security system of claim 11 wherein the first and second security interfaces each includes:
an encapsulator configured to add to a packet a tunnel header addressed from the virtual security interface;
a de-encapsulator configured to remove from a tunnel packet a tunnel header addressed to the virtual security interface;
an encryptor operative coupled to the encapsulator, the encryptor configured to encrypt a packet from a secured network;
an de-encryptor operative coupled to the de-encapsulator, the de-encryptor configured to de-encrypt a packet; and
an authenticator operatively coupled to the encryptor and the de-encryptor configured to authenticate a packet.

13. The network security system of claim 11 further comprising a proxy configured to answer requests for an address of the virtual security interface with addresses of the first and second security interfaces.

14. A computer program product comprising:
a non-transitory machine-accessible and readable device embodying computer usable code for network security for exchanging IP packets and IP tunnel packets between secured networks, wherein the computer usable code when executed by a computer causes the computer to:
determine whether first and second packets received from a first secured network are addressed to a virtual security interface that represents, logically, a plurality of security interfaces to a second secured network;
establish at a first one of the plurality of security interfaces, a first secured network connection between the first secured network and the second secured network for the first packet, the first secured network connection being established when the first and second packets are addressed to the virtual security interface;
respond to a network condition by establishing, at a second one of the plurality of security interfaces, at least one second secured network connection between the first secured network and the second secured network for the second packet, the at least one second secured network connection being logically the same as the first secured network connection;
send the first and second packets to the second secured network using both the first and the at least one second secured network connections; and
wherein the first and the at least one second secured network connections are established using the address of the virtual security interface to which the first and second packets are addressed rather than using the addresses of the first and second security interfaces to conserve addresses.

15. The network security system of claim 11 wherein the virtual security interface is further configured to share a security policy between the plurality of security interfaces, the first secured network connection and the at least one second secured network connection established according to the shared security policy.

16. The network security system of claim 11 wherein the virtual security interface is further configured to offload a network security burden from the first secured network connection to the at least one second secured network connection.

17. The network security system of claim 11 wherein the virtual security interface is further configured to balance a network load from the first secured network connection to the at least one second secured network connection.

18. The network security system of claim 11 wherein the virtual security interface is further configured to resiliently route from the first secured network connection to the at least one second secured network connection.

19. The network security system of claim 11 wherein the virtual security interface is further configured to secure a packet from the first secured network to the second secured network.

20. The network security system of claim 19 wherein the virtual security interface is configured to secure the packet by encrypting and authenticating the packet from a secured network according a security policy.

* * * * *